United States Patent [19]

Loos, II et al.

[11] 4,128,622

[45] Dec. 5, 1978

[54] PROCESS FOR PRODUCING HYDROGEN CYANIDE

[75] Inventors: Karl D. Loos, II; Kenneth C. McCullough, both of Memphis, Tenn.; Don Q. Whitworth, Keller, Tex.

[73] Assignee: E. I. Du Pont de Nemours and Company, Wilmington, Del.

[21] Appl. No.: 718,141

[22] Filed: Aug. 27, 1976

[51] Int. Cl.$^2$ ............................................. C01C 3/02
[52] U.S. Cl. ............................................................ 423/376
[58] Field of Search ........................... 423/376, DIG. 5

[56] References Cited

U.S. PATENT DOCUMENTS

| 3,104,945 | 9/1963 | Jenks et al. | 423/376 |
| 3,312,529 | 4/1967 | Evand | 423/DIG. 5 |
| 3,370,919 | 2/1968 | Pan | 423/376 |

OTHER PUBLICATIONS

Pan et al., I & E C Process Design & Development, vol. 7, No. 1, 1968, p. 53, Optimization of Yield through Feed Composition.

*Primary Examiner*—O. R. Vertiz
*Assistant Examiner*—Thomas W. Roy

[57] ABSTRACT

Hydrogen cyanide is commercially produced by reacting in the vapor phase ammonia, air, and a hydrocarbon gas, e.g., natural gas, in the presence of a platinum group metal catalyst. The operation of this process to obtain optimum hydrogen cyanide production is accomplished by determining HCN production at various natural gas feed rates, i.e., varying the air/natural gas ratio, while maintaining a constant air/ammonia ratio. Once the production peak is located, the natural gas feed is maintained at the corresponding rate.

7 Claims, 2 Drawing Figures

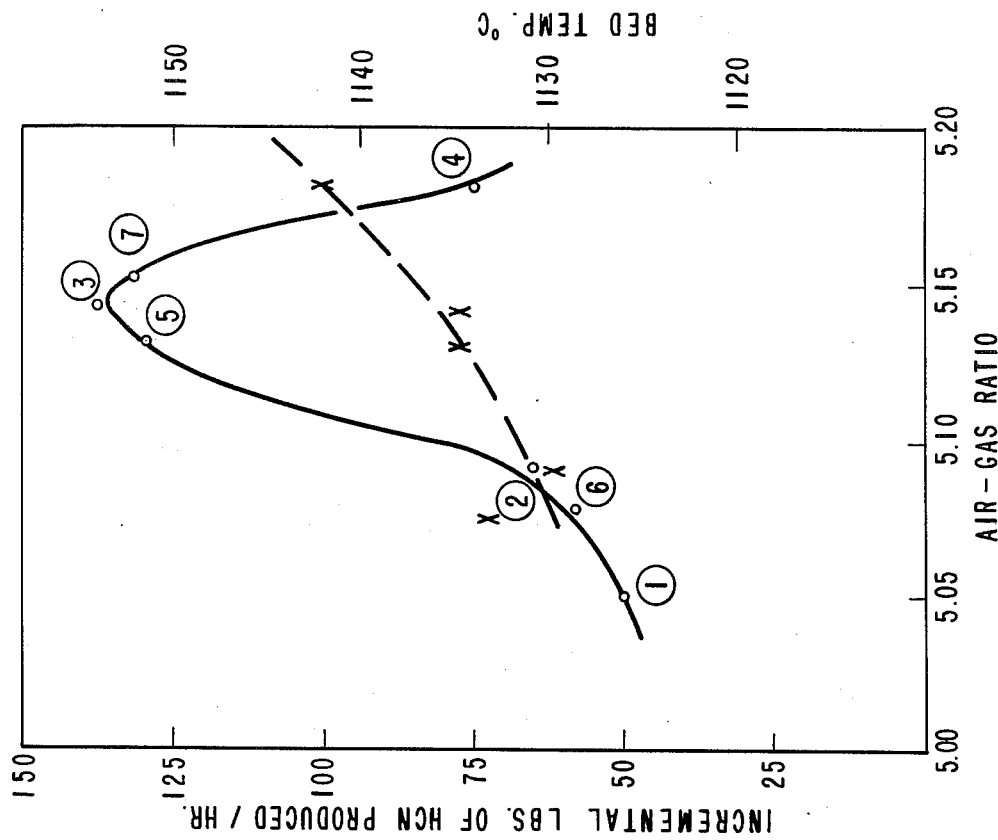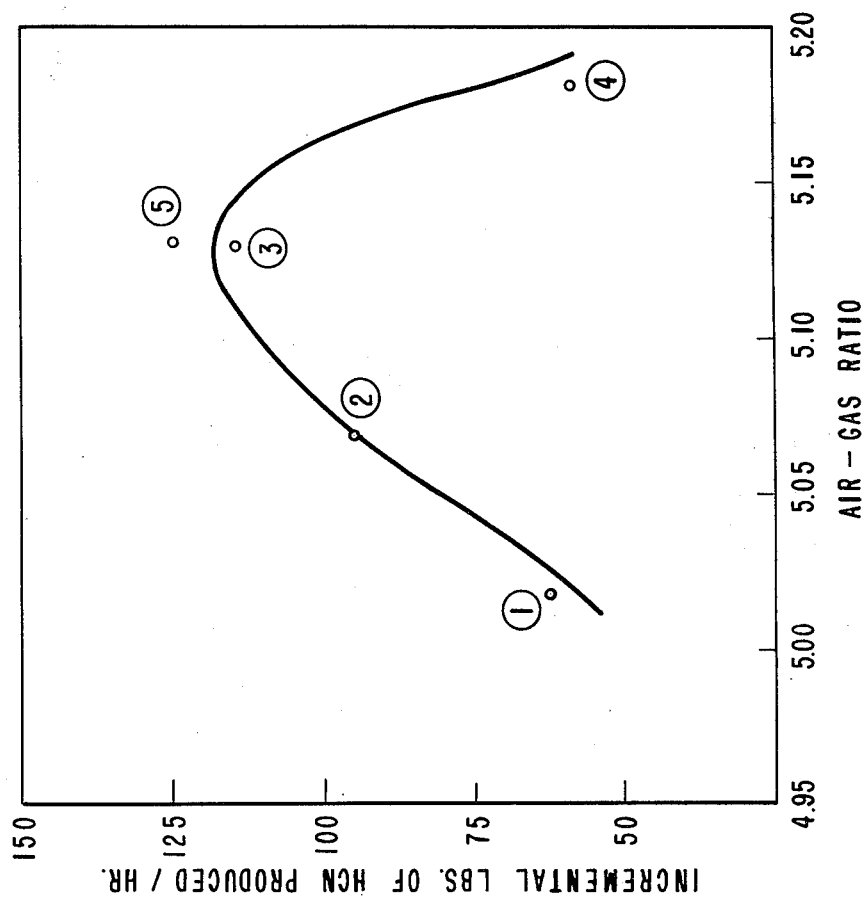

4,128,622

PROCESS FOR PRODUCING HYDROGEN CYANIDE

BACKGROUND OF THE INVENTION

This invention relates to an improvement in a process for making hydrogen cyanide (HCN).

HCN can be produced by a process comprising contacting in vapor phase, ammonia, a hydrocarbon, e.g., methane or natural gas, and an oxygen-containing gas in the presence of a platinum-group metal catalyst at high temperature. In commercial operations, the reactants are generally ammonia, natural gas and air. This one-stage synthesis of HCN from ammonia and natural gas in which heat is supplied by simultaneous combustion reactions with air is disclosed in U.S. Pat. No. 1,934,838 issued to Andrussow on Nov. 14, 1933. Numerous modifications and improvements pertaining to this process have been described and patented.

It is known that in the reaction of ammonia, natural gas and air to produce HCN, one of the most important variables with respect to HCN yield and conversion is the composition of the feed gas. While any two ratios of reactants can fix the feed gas composition, various combinations of these ratios can and have been employed. Optimum ratios vary depending upon operating conditions, such as throughput, catalyst type and age, preheat, and reactor geometry. Hence, the optimum ratio needs to be determined and regulated periodically so as to assure maximum productivity and yield.

Various process techniques have been developed for obtaining improved HCN yields. For example, several patents, e.g., U.S. Pat. No. 3,104,945 and British Pat. No. 956,200, describe preheating the feed gases and maintaining specified ratios of reactants. With the use of preheat it is possible to add more ammonia to the reaction without reducing the reaction or catalyst bed temperature, thus increasing production of HCN.

U.S. Pat. No. 3,370,919 issued to Pan on Feb. 27, 1968 discloses that control of the reaction of methane, ammonia and air to produce HCN is effected by measuring the reaction or flame temperature and/or off-gas temperature produced at a given air/(CH$_4$ + NH$_3$) ratio and adjusting the CH$_4$/NH$_3$ ratio until a minimum reaction or flame temperature and/or a minimum off-gas temperature is obtained. Yield of HCN is said to be maximized at the minimum reaction or flame temperature while conversion of HCN is said to maximize at the minimum off-gas temperature. Additional details on this process can be found in an article by B. Y. K. Pan and R. G. Roth entitled "Optimization of Yield Through Feed Composition," I & EC Process Design and Development, Vol. 7, No. 1, pages 53–61 (January 1968). A further article on maximizing yield in the HCN process authored by B. Y. K. Pan and entitled "Elaboration and Extension of Experimental Results Through Mathematical correlations and Fundamental Knowledge" can be found in I & EC Process Design and Development, Vol. 8, NO. 2, pages 262–266 (April 1969).

In practice the process disclosed by Pan has not provided optimum HCN production in all Andrussow-type processes. In some such processes, controlling the reaction at minimum reaction or flame temperature has not resulted in optimum HCN production; increased production of HCN can be obtained at temperatures other than minimum bed temperature. Furthermore, in many HCN converters the reaction or flame temperature will vary considerably across the gauze catalyst, the uneven heating thus creating problems in the use of the Pan technique.

SUMMARY OF THE INVENTION

An improved process for producing HCN by contacting ammonia, a hydrocarbon and an oxygen-containing gas has been developed.

This process is based on determining HCN production by varying the air-gas feed ratio within limits while maintaining the air-ammonia feed ratio constant. Once the maximum production rate is obtained, the process feed ratios are maintained at the corresponding settings. Specifically, the process involves:

(1) feeding to the converter a ratio of oxygen-containing gas, e.g., air, to hydrocarbon gas, e.g., natural gas, within the range of 4.5:1 to 5.5:1, the flow of air being at its maximum rate, as determined by the physical constraints, (2) feeding to the converter a ratio of air to ammonia within the range of 3.0:1 to 9.0:1.

(3) measuring the converter off-gas to determine the weight percent of HCN present at the selected ratios, (4) varying the natural gas feed while maintaining the air to ammonia ratio constant, i.e., either increasing or decreasing the amount of natural gas, (5) continuing to vary the natural gas feed until the highest weight percent of HCN in the off-gas is obtained, and (6) maintaining the natural gas feed at the rate corresponding to the highest weight percent of HCN in the off-gas.

DESCRIPTION OF THE DRAWING

FIG. 1 is a plotting of HCN production per hour with respect to the air/natural gas ratio.

FIG. 2 is based on the Example and is the plotting of HCN production per hour with respect to the air/natural gas ratio and the reaction or bed temperature.

DETAILED DESCRIPTION OF THE INVENTION

In the process of the invention HCN is produced by contacting in a vapor phase, ammonia, a hydrocarbon and an oxygen-containing gas in the presence of a platinum-group metal catalyst at a high temperature and controlling the conversion of NH$_3$ and production of HCN as set forth herein.

Suitable hydrocarbons, as disclosed in U.S. Pat. No. 1,934,838, include aliphatic, cycloaliphatic and aromatic hydrocarbons. Methane or a methane-containing gas, such as natural gas, is a preferred hydrocarbon for the present process. Ammonia used in the process of the invention is substantially pure ammonia. Suitable oxygen-containing gases include air and oxygen-containing inert gases having an oxygen content roughly equivalent to that of air. In the following paragraph the invention will be discussed in terms of the usual commercial process which employed natural gas, air and ammonia; however, it should be understood that the invention is not so limited.

The platinum-group metal catalyst employed in the process of the invention is selected from the group consisting of platinum, rhodium, iridium, palladium, osmium, ruthenium, and a mixture or alloy of two or more of the foregoing metals. The platinum-group catalyst can be employed in the form of sheets, wires, turnings, etc., the preferred form being one or more layers of a fine wire gauze. The metal can also be used in the form of a coating on an inert substrate, such as beryl (beryllium aluminum silicate), alumina, sillimanite, etc.

In the process of the invention the gaseous ammonia, natural gas and air are fed into a converter containing a bed of the previously described catalyst, which is maintained at a temperature of from about 1000° C.–1200° C.

The feed of air into the converter should be set at the maximum flow obtainable for its design, i.e., the blowers, converter design, i.e., converter diameter, and process interlocks will determine this rate. It is known that increased air flow increases ammonia conversion to HCN; thus when operating to obtain production rates greater than 65% of the maximum, maximum air flow should be maintained. During period of low production rates, it may be desirable to use less than maximum air flow.

The initial air to natural gas ratio should be in the range of 4.5:1 to 5.5:1; this ratio will subsequently be adjusted by adding or decreasing natural gas to achieve maximum production.

It is preferred that air and natural gas be preheated prior to being mixed with the ammonia and fed into the converter. Such preheating is described in detail in U.S. Pat. No. 3,104,945 to Jenks et al. When preheating is employed, the gases are usually heated to temperatures between 300° and 500° C., preferably 450°–490° C. In some embodiments ceramic materials of construction can be employed and the gas may be preheated up to temperatures of 1100° C.

The air to ammonia ratio is then set between 3.0:1 to 9.0:1. The ratio used is based on prior experience and will usually be in the range of 3.0:1 to 6.0:1. If preheat is employed, the range will usually be between 3.3:1 to 5.0:1. With preheating additional ammonia can be added which in turn increases HCN production and lowers the reaction temperature, i.e., bed temperature. In most embodiments of the process of the invention it will be desirable to set the ammonia feed as high as possible. The constraints on ammonia feed are, first, ammonia cools the reaction or bed temperature and this cannot be cooled below the minimum reaction temperature and second, unreacted ammonia can cause an environmental problem if present to a large extent in the converter effluent.

The air to ammonia ratio is fixed at selected setting and thereafter constantly maintained at this ratio. The maximum HCN production is then determined for this fixed ratio. If this ratio is ever changed, the entire sequence of steps must be conducted to determine the peak production feed ratios for the new air/ammonia ratio.

In keeping the air/ammonia ratio constant, it is important that a constant mass flow of air and ammonia be fed into the converter. This can be accomplished by measuring the pressure and temperature of these feeds and using these measurements to maintain constant mass flow. One method of doing this is to continuously monitor the pressure and temperature and employ a computer to adjust the controller to maintain constant mass flow.

The output of the converter is then sampled by an on-line process analyzer to determine the volume percent of HCN in the reactor off-gas. On-line process analyzers that can be used are gas chromatographs or infra-red analyzers.

The volume percent is then converted into weight percent by any appropriate means, e.g., by measuring the density directly using a density meter or by using an experimentally determined average molecular weight at the off-gas. The resulting weight percent of HCN times the off-gas flow is the production for the existing feed conditions.

The air to natural gas ratio is then varied to determine the HCN production at a different air/gas ratio for comparison. The ratio is changed by changing the rate of natural gas feed, by either adding or reducing natural gas.

The weight percent of HCN in the off-gas is then determined for the new gas feed rate. This result is then compared with the prior one. This process is repeated until the results indicate the feed rate wherein the maximum amount of HCN is being produced. The natural gas is then maintained at the feed rate corresponding to the maximum HCN production. As set forth previously the optimum point will change depending on various factors such as throughput and catalyst age, accordingly the process will have to be repeated at some interval to maintain maximum production. The interval to be employed will be based on experience with the particular converter involved, and may vary from a few hours to 24 hours or more.

FIG. 1 illustrates a typical operation of the process of the invention. The HCN production is first determined for a specific air/gas ratio (1) on the Figure. Natural gas feed is decreased, and a second reading (2) of HCN production is obtained. Result (2) is compared with (1) and further decreases of natural gas are made (3), and (4), until the comparison indicates that the production peak has been passed. In this case an additional change was made by increasing the natural gas feed (5) and the peak identified. In some instances, it will be desirable to pass over the peak at least two times to reduce the possibility of locating a false maximum. This embodiment is illustrated in FIG. 2 and the Example.

The identification of the peak can be accomplished manually by plotting or the like; however, one of the advantages of the process is that it lends itself to computer operation. Thus, a computer with a suitable program can be employed to determine HCN production and adjust the air/gas ratios until the production peak is obtained.

The off-gas from the converter is treated in conventional ways in order to recover the hydrogen cyanide produced; or if desired, it can be further treated to make alkali or other metal cyanides. One further advantage of the process of the invention is that by improving HCN production, less nitriles and other byproducts will be produced, thus reducing separation problems in these subsequent steps.

The process of the invention is further illustrated by the following example.

EXAMPLE

Air and natural gas are preheated to 455° C. and fed into a converter containing a platinum-rhodium aloy catalyst (10% rhodium and 90% platinum). The catalyst is maintained at a temperature between 1100° and 1150° C. The converter is circular in cross section and has a diameter of 6 feet.

The air/natural gas ratio is initially set at 5.05. The flow rate of air is 9170 scfm.

Ammonia is fed into the converter to obtain an air to ammonia ratio of 4.80:1.

The reactor off-gas is analyzed and the volume percent of HCN present is determined. The weight percent of HCN is then found using a predetermined average molecular weight and converted into lbs. of HCN per hour and plotted on FIG. 2 at point (1).

While maintaining air to ammonia ratio constant, natural gas feed is decreased to provide three additional HCN production readings, (2), (3) and (4). The natural gas feed was then increased to provide readings (5) and (6). A final reading (7) was made at an air to gas ratio of 5.15 and the peak was identified, i.e., approximately at an air/gas ratio of 5.14. The natural gas feed is maintained at this rate, and maximum HCN production is obtained.

The bed temperature was also measured for the various air/gas ratios compared. The readings are indicated by the dotted line on FIG. 2. This plotting indicates that for the particular converter involved and the air/ammonia ratio employed; minimum bed temperature does not correspond to maximum HCN production.

We claim:

1. In a process for producing hydrogen cyanide by contacting in a converter in the vapor phase, ammonia, a hydrocarbon gas and an oxygen-containing gas which contain about 21% by volume oxygen, in the presence of a platinum-group metal catalyst at a temperature of from about 1000° C. to 1200° C. to produce an off-gas containing hydrogen cyanide, the improvement comprising (1) feeding to said converter a ratio of oxygen-containing gas to hydrocarbon gas within the range of 4.5:1 to 5.5:1,
   (2) feeding to said converter a ratio of oxygen-containing gas to ammonia within the range of 3.0:1 to 9.0:1,
   (3) measuring the converter off-gas to determine the weight percent of the hydrogen cyanide present at these ratios and then calculating HCN production,
   (4) varying the hydrocarbon gas feed while maintaining the oxygen-containing gas to ammonia ratio constant,
   (5) continuing to vary the hydrocarbon gas feed until the highest calculated HCN production is obtained, and
   (6) maintaining the hydrocarbon gas feed at the rate corresponding to the highest production of hydrogen cyanide in the off-gas.

2. The process of claim 1 wherein the hydrocarbon gas is natural gas and the oxygen-containing gas is air.

3. The process of claim 2 wherein the hydrocarbon gas and oxygen-containing gas are preheated to a temperature above 300° C. prior to being fed into the converter.

4. The process of claim 3 wherein the oxygen-containing gas to ammonia ratio is from 3.3:1 to 5.0:1.

5. The process of claim 1 wherein the volume percent of HCN in the converter off-gas is sampled by an on-line analyzer.

6. The process of claim 5 wherein the analyzer is a gas chromatograph.

7. The process of claim 5 wherein the analyzer is an infra-red analyzer.

* * * * *